United States Patent [19]

Kahlbrock

[11] 4,027,114

[45] May 31, 1977

[54] ECHO PREVENTION CIRCUIT

[75] Inventor: Heinz Kahlbrock, Holmdel, N.J.

[73] Assignee: Bell Telephone Laboratories, Incorporated, Murray Hill, N.J.

[22] Filed: Dec. 22, 1975

[21] Appl. No.: 643,120

[52] U.S. Cl. .................... 179/170.2; 179/170 NC; 179/170.8

[51] Int. Cl.² ...................... H04B 3/22; H04B 1/58

[58] Field of Search ...... 179/170 NC, 170.2, 170.6, 179/170.8

[56] References Cited

UNITED STATES PATENTS

| | | | |
|---|---|---|---|
| 1,881,801 | 10/1932 | Mathes | 179/170.2 |
| 3,180,947 | 4/1965 | Haselton, Jr. et al. | 179/170 NC |
| 3,471,657 | 10/1969 | Holman et al. | 179/170.6 |
| 3,530,260 | 9/1970 | Gaunt, Jr. | 179/170 NC |
| 3,855,430 | 12/1974 | Colardelle et al. | 179/170 NC |

OTHER PUBLICATIONS

Holman and Suhocki; "A New Echo Suppressor"; Bell Labs. Record, vol. 44, No. 4; Apr. 1966; pp. 139–142.

*Primary Examiner*—William C. Cooper
*Assistant Examiner*—Randall P. Myers
*Attorney, Agent, or Firm*—Roy C. Lipton

[57] ABSTRACT

Echo propagation is prevented on four-wire signaling path to two-wire signaling path connections. A first transmission path portion is extended from the receive leg of the four-wire signaling path to the transmit leg and a second transmission path portion is extended from this point to the two-wire signaling path, the first and second transmission path portions thereby forming a bidirectional path carrying signals from the two-wire signaling path and from the receive leg. Detection circuitry is located in the first transmission path portion and develops a voltage signal which determines the direction of signal transmission between the four-wire and two-wire signaling paths. Echo propagation is prevented during signal transmission from the four-wire signaling path to the two-wire signaling path by opening the transmit leg of the four-wire signaling path. Echo propagation is prevented during signal transmission from the two-wire signaling path to the four-wire signaling path by closing the transmit leg and removing gain from the receive leg of the four-wire signaling path.

10 Claims, 1 Drawing Figure

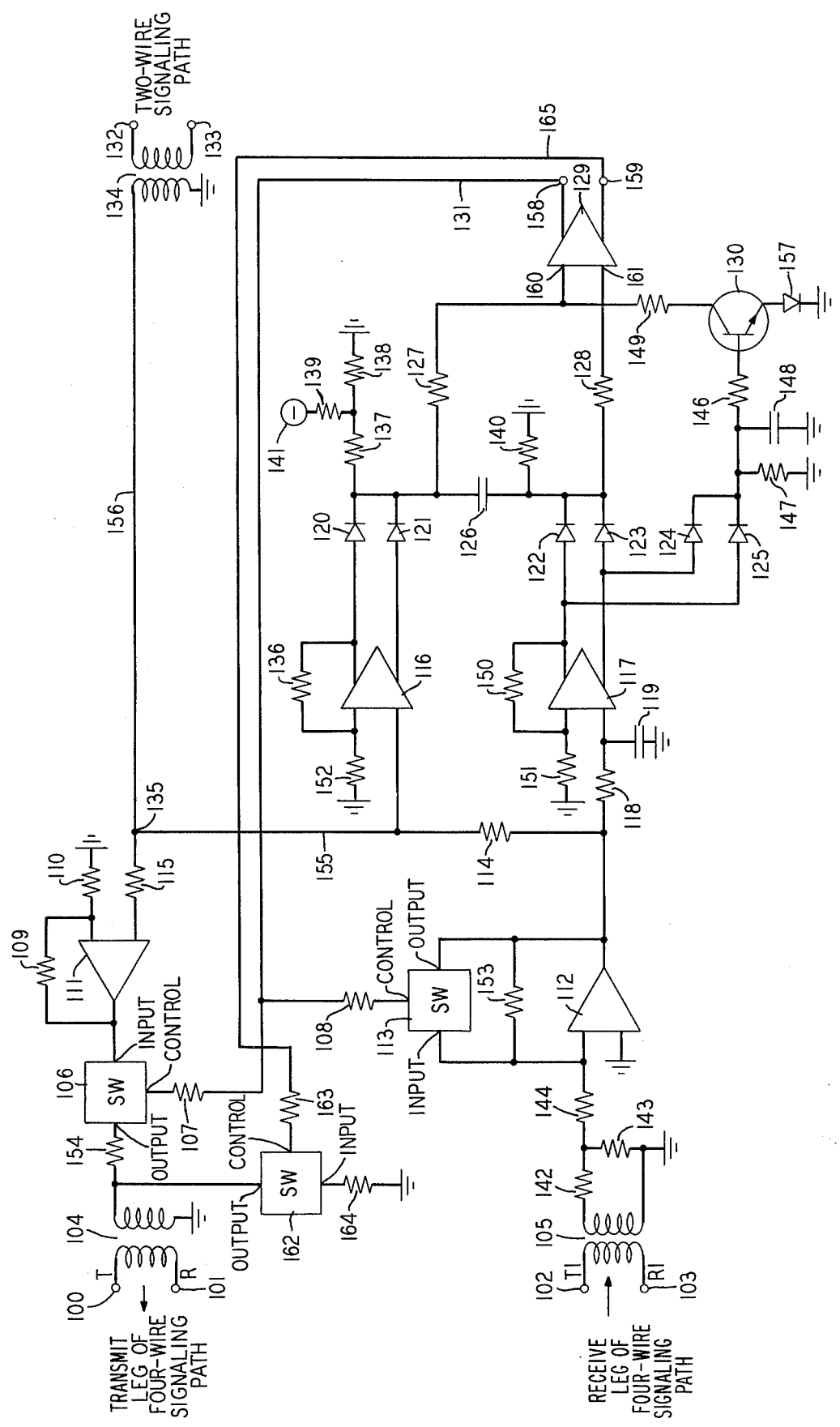

ECHO PREVENTION CIRCUIT

FIELD OF THE INVENTION

This invention relates to echo prevention circuits and, more particularly, to arrangements for signal detection useful for preventing echo propagation on four-wire and two-wire signaling paths.

DESCRIPTION OF THE PRIOR ART

The transmission of data and voice for any appreciable distance is typically accomplished over combinations of four-wire signaling paths containing transmit and receive legs, and two-wire signaling paths. It is well known in the art that impedance mismatches frequently occur while terminating four-wire and two-wire signaling paths, such impedance mismatches resulting in the propagation of echos on both the two-wire and four-wire signaling paths. Various schemes exist in the prior art to prevent the propagation of echoes on two-wire and four-wire signaling paths. In one such scheme, signals traveling from a two-wire signaling path are routed over a first transmission path to the receive leg of the four-wire signaling path and the signal is picked off the receive leg by a detection circuit. The detection circuit, in response to the presence of signals on the receive leg, opens the transmit leg of the four-wire signaling path for a fixed interval of time. Therefore, any echoes propagating down the transmit leg of the four-wire signaling path will be blocked by the open circuit in the transmit leg and will thereby be prevented from returning to the signal source. Similarly, signals traveling from the transmit leg of the four-wire signaling path are routed over a second transmission path to the two-wire signaling path and are picked off the transmit leg of the four-wire signaling path by a second detection circuit. This detection circuit, in response to the presence of signals on the transmit leg, opens the receive leg of the four-wire signaling path for a fixed interval of time thereby preventing any return echoes from propagating down the receive leg of the four-wire signaling path and returning to the signal source.

This scheme, although preventing the propagation of echoes, requires that the transmit and receive legs of the four-wire signaling path be maintained in an open state for a fixed interval of time each time they are opened. During the fixed interval, this scheme is incapable of responding to a change in the direction of signal transmission as the circuitry on the open leg which detects the reversed direction of transmission is removed from the signaling path during the fixed interval. This drawback renders the use of this scheme undesirable in most situations wherein it is desired to suppress the propagation of echoes.

Another approach known in the art, which overcomes the drawback in the previous scheme, is the utilization of a differential signal detection technique to accomplish echo prevention. With this approach, signals are routed over a first transmission path from the two-wire signaling path to the receive leg of the four-wire signaling path and over a second transmission path from the transmit leg of the four-wire signaling path to the two-wire signaling path. The signals on the transmit and receive legs of the four-wire signaling path are detected by separate unidirectional amplification circuits located in each leg of the four-wire signaling path. These signal levels are compared and a determination is made as to the direction of signal transmission based on the difference between the signal level on the transmit leg and the signal level on the receive leg of the four-wire signaling path. Once the direction of signal transmission has been determined, echo suppression devices are inserted in the proper leg of the four-wire signaling path to prevent the propagation of echoes.

This approach does not open and close the transmit or receive legs of the four-wire signaling path to prevent echo propagation but merely inserts echo suppression devices in the proper leg. Therefore, the signal detection circuitry is never removed from the signaling path and is always capable of detecting a change in the direction of signal transmission. However, in so doing, this approach requires separate devices in each leg of the four-wire signaling path to detect the signals and comparison circuitry to determine the direction of signal transmission. Moreover, the detection devices in each leg of the four-wire path must be carefully matched and must track each other in their operation in order to prevent the introduction of a bias into the comparison circuitry. These requirements render these detection devices inherently expensive and complex and also require that frequent maintenance be performed on these detection devices in order for them to operate properly.

It is therefore an object of this invention to provide a simple and inexpensive technique for preventing echo propagation in the presence of rapid changes in signal direction on four-wire and two-wire signaling paths.

SUMMARY OF THE INVENTION

In accordance with the invention, the first and second transmission paths extending between the four-wire signaling path and the two-wire signaling path are interconnected by a path portion which forms a bidirectional highway carrying signals from the receive leg of the four-wire signaling path and from the two-wire signaling path. Direction of signal transmission is determined by a detection device in the bidirectional path portion.

It is a feature of the invention that the detection device located in the path portion develops a voltage signal in response to the bidirectional passage of signals between the four-wire signaling path and the two-wire signaling path and it is another feature of the invention that comparison circuitry in response to the voltage signal developed by the detection device determines the difference between the signal level on the four-wire signaling path and the signal level on the two-wire signaling path.

It is another feature of the invention that, to prevent echo propagation, the transmit leg of the four-wire signaling path is normally opened, and, when the signal level on the two-wire signaling path exceeds the signal level on the receive leg of the four-wire signaling path, the receive leg of the four-wire signaling path is closed and gain is removed from the transmit leg of the four-wire signaling path.

It is a further feature of the invention that the receive leg of the four-wire signaling path is locked in an open state at the time the signal level on the transmit leg of the four-wire signaling path exceeds the signal level on the two-wire signaling path.

The foregoing and other objects and features will be more fully understood from the following description of an illustrative embodiment thereof taken in conjunction with the accompanying drawing.

BRIEF DESCRIPTION OF THE DRAWING

The drawing discloses the circuit details of a simplified arrangement for preventing the propagation of echoes on a four-wire and two-wire signaling path in accordance with the invention.

DETAILED DESCRIPTION

Refer to the drawing. Therein is shown the details of an echo prevention circuit. Terminals 100 and 101 terminate the transmit leg of a four-wire signaling path, and terminals 102 and 103 terminate the receive leg of the four-wire signaling path. Terminals 132 and 133 terminate the two-wire signaling path. The two-wire signaling path is directly connected to the transmit leg of the four-wire signaling path via transmission path 156. The transmit leg of the four-wire signaling path is connected to the receive leg of the four-wire signaling path via transmission path 155. Transmission paths 155 and 156 in combination form a bidirectional highway for carrying signals from the receive leg and from the two-wire signaling path as will be detailed hereinafter. Amplifiers 111 and 112 are standard voice frequency operational amplifiers and, could, for example, be operational amplifiers 559A manufactured by Western Electric Company, Incorporated. These two amplifiers serve to provide gain in the transmit leg and receive leg of the four-wire signaling path. Resistors 109, 110 and 153 provide gain adjustment and bias for amplifiers 111 and 112 in a manner well known in the art. Amplifiers 116 and 117 are standard balanced output operational amplifiers and could, for example, be operational amplifiers 502AH manufactured by Western Electric Company, Incorporated. Amplifier 117 serves to monitor the a.c. signals present on the receive leg of the four-wire signaling path. Amplifier 116 monitors the a.c. signals present on the two-wire signaling path. Resistors 136, 150, 151 and 152 provide gain adjustment and bias for amplifiers 116 and 117 in a manner well known in the art.

Comparator 129 is basically the same type of amplifier as amplifiers 116 and 117, but is configured to operate as a comparator. When the voltage level of signals present on input terminal 161 of comparator 129 exceeds the voltage level of signals present on input terminal 160, output terminal 158 of comparator 129 is equal to a negative voltage potential while output terminal 159 of comparator 129 is equal to a positive potential. Similarly, when the level of signals on input terminal 160 exceed the level of signals on input terminal 161, output terminal 158 of comparator 129 assumes a positive voltage potential and output terminal 159 assumes a negative voltage potential.

Switches 106, 113 and 162 are COS/MOS bilateral switches. Such switches are commercially available and could, for example, be bilateral switch CD4066AD manufactured by RCA Incorporated. Switches 106, 113 and 162, in response to a positive voltage applied to their respective control terminals, assume an ON state providing a connection between their respective input and output terminals. Similarly, switches 106, 113 and 162 assume an OFF state in response to a negative voltage applied to their control terminals which breaks the connection between their respective input and output terminals. In the drawing, switches 106 and 113 are normally in the OFF state and switch 162 is normally in the ON state. This is accomplished in the following manner. With no signals present on the four-wire or two-wire signaling paths, input terminal 161 of comparator 129 is at approximately ground potential due to the path from input terminal 161 through resistor 128 and 140 to ground. Input terminal 160 of comparator 129 is at a negative potential due to the negative voltage applied thereto from voltage source 141 through voltage divider resistors 137, 138 and 139, and connecting resistor 127. As input terminal 160 is therefore negative with respect to input terminal 161, output terminal 158 of comparator 129 is at a negative potential and output terminal 159 of comparator 129 is at a positive potential. The negative potential is applied via line 131 and resistors 107 and 108 to the control terminals of switches 106 and 113, and the positive potential is applied via line 165 and resistor 163 to the control terminal of switch 162. Therefore, switches 106 and 113 are biased in the OFF state and switch 162 is biased in the ON state when signals are not present on the four-wire and two-wire signaling paths.

The circuitry in the drawing serves to provide proper path termination for both the transmit and receive legs of the four-wire signaling paths and the two-wire signaling path. The receive leg of the four-wire signaling path is coupled through transformer 105 and is applied to resistors 142 and 143, and 144. (The input impedance of amplifier 112 is low and therefore resistor 144 is essentially in parallel with resistor 143). These three resistors are of sufficient value to provide proper path termination for the receive leg of the four-wire signaling path. The transmit leg of the four-wire signaling path, coupled through transformer 104, is grounded through normally closed switch 162 and resistor 164. Resistor 164 is of sufficient value to provide proper path termination for the transmit leg of the four-wire signaling path. The output impedance of amplifier 112 is very low and therefore the end of resistor 114, connected to the output of amplifier 112, is at approximately ground potential. Therefore, the two-wire signaling path coupled through transformer 134 is applied to ground through resistor 114. Resistor 114 is of sufficient value to provide proper path termination for the two-wire signaling path.

The circuit in the drawing functions to connect the four-wire signaling path to the two-wire signaling path and prevents the propagation of echoes on both the two-wire and four-wire signaling paths. Connection of the two-wire signaling path to the transmit leg of the four-wire signaling path is provided by a direct connection between transformer 134 and the input to amplifier 111 via transmission path 156. Connection of the two-wire signaling path to the receive leg of the four-wire signaling path is provided by transmission path 155 extending from the output of amplifier 112 to junction 135. The propagation of echoes on the four-wire signaling path is prevented in the following manner. Assume that it is desired to carry signals from the receive leg of the four-wire signaling path to the two-wire signaling path. Signals present on the receive leg of the four-wire signaling path are coupled through transformer 105 and limiting resistors 142 and 144, amplified by amplifier 112, and applied to the two-wire signaling path via transmission path 155, transmission path 156 and transformer 134. The signals present at the output of amplifier 112 are detected by amplifier 117. In addition, these signals, while being transmitted over transmission path 155, cause a voltage drop across resistor 114. This voltage drop, developed across resistor 114, is in turn detected by amplifier 116. The signals detected by amplifiers 116 and 117 are amplified by these respective amplifiers, and applied to diodes 120 through 123. Diodes 120 and 121 provide a full wave rectification function for the output signals of amplifier 116 and the rectified signal is filtered by capacitor 126. This rectified a.c. voltage is applied to input terminal 160 of comparator 129 via resistor 127. Diodes 122 and 123 similarly full wave rectify the output signal of amplifier 117 and the rectified signal is filtered by capacitor 126. This rectified signal is applied to input terminal 161 of comparator 129 via resistor 128. As described above, a negative bias is normally applied to input terminal 160 of comparator 129. In addition, the positive potential applied to input terminal 161 of comparator 129 by the rectified output of amplifier 117 normally ensures that input terminal 160 will remain negative with respect to input terminal 161, thereby maintaining the output of comparator 129 in its normal state, i.e., output terminal 158 at a negative potential and output terminal 159 at a positive potential. The output of comparator 129 while remaining in this state, ensures that switch 106 remains OFF thereby preventing the received signal or any echoes returning on the two-wire signaling path from propagating down the transmit leg of the four-wire signaling path. In this manner, therefore, echoes are advantageously prevented from propagating down the transmit leg of the four-wire signaling path during signal transfer from the receive leg of the four-wire signaling path to the two-wire signaling path.

The propagation of echoes on the two-wire signaling path is prevented in the following manner. Assume transmission of a signal from the two-wire signaling path through transformer 134 and to the transmit leg of the four-wire signaling path at junction 135. Recall from what precedes that the output impedance of amplifier 112 is very low thereby providing a path to ground for resistor 114. Therefore the signals present at junction 135 will travel down transmission path 155 and cause a voltage drop across resistor 114 which will be detected by amplifier 116. At this time, the input to amplifier 117 is approximately at ground potential through resistor 118 and the output of amplifier 112, as described above. Amplifier 116, in response to the presence of signals at junction 135 amplifies these signals and applies them to diodes 120 and 121. Diodes 120 and 121 full wave rectify this signal and apply a positive d.c. potential to input terminal 160 of comparator 129. At this time, input terminal 161 of comparator 129 is at approximately ground potential due to the lack of a signal on the output of amplifier 117. Input terminal 160 therefore is of greater potential than input terminal 161. In response thereto, output terminal 158 of comparator 129 assumes a positive potential and output terminal 159 assumes a negative potential. The positive potential is applied via line 131 to the control inputs of switches 106 and 113 and the negative potential is applied via line 165 to the control input of switch 162. In response thereto, switches 106 and 113 are turned ON and switch 162 is turned OFF. Turning switch 106 ON provides a completed path from junction 135 through amplifier 111, switch 106, resistor 154, and transformer 104 to the transmit leg of the four-wire signaling path. Turning switch 162 OFF opens the path from transformer 104 to ground via resistor 164. Therefore, the signals being transmitted from the two-wire signaling path are coupled directly through to the transmit leg of the four-wire signaling path. Turning ON switch 113 effectively removes amplifier 112 from the receive leg of the four-wire signaling path by bypassing this amplifier with a short circuit. Therefore, any return echoes present on the receive leg of the four-wire signaling path are reduced in value by an amount equal to the gain of amplifier 112. These return echoes are, of course, reduced an additional amount due to the voltage drop across resistor 114. Reducing the echoes by this amount effectively renders the echoes harmless when they return down the two-wire signaling path to the signal source. Upon termination of signal transmission on the two-wire signaling path, comparator 129 will revert to its previous state due to the negative bias applied to input terminal 160 from voltage source 141. In this manner, therefore, the propagation of echoes is prevented on the two-wire signaling path during signal transmission from the two-wire signaling path to the four-wire signaling path. The reversion of comparator 129 to its previous state upon the termination of signal transmission will return switches 106 and 113 to the OFF state and return switch 162 to the ON state thereby ensuring that the circuitry in the drawing is prepared for any forthcoming signal transmissions from the four-wire signaling path to the two-wire signaling path.

It is possible during transmission from the four-wire signaling path to the two-wire signaling path, that the signal level on transmission path 155 could reach a level sufficient to force amplifiers 116 and 117 into a nonlinear region of amplification and cause them to begin clipping. In this condition, it is conceivable that the rectified output of amplifier 116 could cause input terminal 160 of comparator 129 to become more positive than input terminal 161. If this should occur, the output state of comparator 129 would reverse, causing switch 106 to close, thereby eliminating the echo protection. In order to ensure that this does not occur, transistor 130 is employed. More particularly, the output signal of amplifier 117 is full wave rectified by diodes 124 and 125, and filtered by resistor 147 and capacitor 148. This potential is then applied to the input of transistor 130 via resistor 146 which turns on this transistor. Turning transistor 130 ON places input terminal 160 of comparator 129 at approximately ground potential via resistor 149, transistor 130 and diode 157. This ensures, therefore, that input terminal 161 of comparator 129 is at a higher signal potential than input terminal 160 of this amplifier. As a result, the output of comparator 129 remains negative, and ensures that switches 106 and 113 remain in the OFF state and that switch 162 remains in the ON state. Therefore, during transfer of signals from the receive leg of the four-wire signaling path to the two-wire signaling path, switch 106 is locked in the OFF state preventing the propagation of echoes which may return on the two-wire signaling path.

In summary, the circuitry in the drawing is normally biased to allow signal propagation from the receive leg of the four-wire signaling path over transmission paths 155 and 156 to the two-wire signaling path. In this condition, switch 106 is open, effectively preventing the propagation of echoes down the transmit leg of the four-wire signaling path and also preventing the transmitted signal from traveling down the transmit leg of the four-wire signaling path. The circuitry in the drawing ensures that the direction of transmission is maintained in this direction by detecting the signal developed across resistor 114 with amplifier 117, rectifying the signal and applying a positive potential to input terminal 161 of comparator 129 and to the input of transistor 130. Transistor 130 is placed in the ON state in response to this signal and pulls input terminal 160 of comparator 129 down to approximately ground potential. This, in combination with the positive potential on input terminal 161 of comparator 129 ensures that the output of comparator 129 remains in the negative state, locking switches 106 and 113 in the OFF state. Upon cessation of transmission from the four-wire signaling path to the two-wire signaling path, the circuitry in the drawing is capable of rapidly responding to changes in the direction of signal transmission. More particularly, signals are transmitted from the two-wire signaling path to the transmit leg of the four-wire signaling path via transmission path 156. These signals propagate down transmission path 155 and develop a voltage signal across resistor 114, which is detected by amplifier 116, full wave rectified, and applied to input terminal 160 of comparator 129. In response thereto, comparator 129 changes state and applies a positive potential to switches 106 and 113 via line 131. Switches 106 and 113 are then turned ON, and switch 162 is turned OFF, thereby allowing the signals to be transmitted down the transmit leg of the four-wire signaling path and simultaneously preventing any return echoes from returning down the two-wire signaling path to the signal source by shorting out amplifier 112.

Although a specific embodiment of this invention has been shown and described, it will be understood that various modifications may be made without departing from the spirit of the invention.

I claim:

1. A circuit providing echo suppression on a two-wire signaling path and on a four-wire signaling path, the four-wire signaling path including a transmit leg and a receive leg, the circuit including, a first transmission path for carrying signals from the two-wire signaling path to the transmit leg, a second transmission path for carrying signals from the receive leg to the two-wire signaling path, means for determining the direction of signal transmission between the four-wire signaling path and the two-wire signaling path, and means responsive to the determining means for preventing the propagation of echoes upon the four-wire signaling path and the two-wire signaling path, wherein the improvement comprises, a path portion interconnecting the first and second transmission paths for forming a bidirectional highway carrying signals from the receive leg and from the two-wire signaling path, said determining means being placed in the path portion.

2. A circuit in accordance with claim 1 wherein the determining means includes means for developing a voltage signal in response to the bidirectional passage of signals over the path portion and means responsive to the voltage signal developing means for sensing the difference between the signal level on the receive leg and the signal level on the two-wire signaling path, whereby the direction of signal transmission is determined.

3. A circuit in accordance with claim 2 wherein the sensing means includes first means for monitoring signals on the receive leg and second means for monitoring signals on the two-wire signaling path, means responsive to the first and second means for comparing the signal level on the two-wire signaling path to the signal level on the receive leg, the comparing means normally assuming a first state and assuming a second state at the time the signal level on the two-wire signaling path exceeds the signal level on the receive leg.

4. A circuit in accordance with claim 3 wherein the preventing means includes means for normally opening the transmit leg, the opening means including means responsive to the comparing means and operative at the time the signal level on the two-wire signaling path exceeds the signal level on the receive leg for closing the transmit leg.

5. A circuit in accordance with claim 3 wherein the preventing means further includes means responsive to the first monitoring means and operative at the time the signal level on the receive leg exceeds the signal level on the two-wire signaling path for locking the comparing means in the first state.

6. A circuit for providing echo suppression on a two-wire signaling path and on a four-wire signaling path, the four-wire signaling path including a transmit leg and a receive leg, the circuit including, a transmission path having a first portion extending from the two-wire signaling path to the transmit leg and having a second portion extending from the receive leg to the junction formed by the first portion of the transmission path and the transmit leg, whereby the first and second portions form a bidirectional highway for carrying signals from the receive leg and from the two-wire signaling path.

means included in the bidirectional highway for developing a voltage signal in response to the bidirectional passage of signals between the receive leg of the four-wire signaling path and the two-wire signaling path, means responsive to the voltge signal developing means for comparing the signal level on the two-wire signaling path to the signal level on the receive leg of the four-wire signaling path, and means responsive to the comparing means for preventing the propagation of echoes upon the four-wire signaling path and the two-wire signaling path.

7. A circuit in accordance with claim 6 wherein the preventing means includes means for normally opening the transmit leg and for closing the transmit leg at the time the signal level on the two-wire signaling path exceeds the signal level on the receive leg.

8. A circuit in accordance with claim 7 further including means for inserting gain in the receive leg, the opening and closing means including means for removing the gain from the receive leg at the time the signal level on the two-wire signaling path exceeds the signal level on the receive leg.

9. A circuit in accordance with claim 6 wherein the comparing means normally assumes a first state and assumes a second state at the time the signal level on the two-wire signaling path exceeds the signal level on the receive leg.

10. A circuit in accordance with claim 9 further including means operative at the time the signal level on the receive leg exceeds the signal level on the two-wire signaling path for locking the comparing means in the first state.

* * * * *